United States Patent [19]

Blanchard

[11] 4,285,489
[45] Aug. 25, 1981

[54] STAND FOR SUPPORTING A HAND-HELD IMPLEMENT

[76] Inventor: Floyd W. Blanchard, 4347 Sarah St., Burbank, Calif. 91505

[21] Appl. No.: 24,267

[22] Filed: Mar. 27, 1979

[51] Int. Cl.³ .............................................. A47F 7/14
[52] U.S. Cl. ..................................... 248/471; 248/166
[58] Field of Search .............. 248/126, 165, 166, 470, 248/471, 528, 529, 532

[56] References Cited

U.S. PATENT DOCUMENTS

| | | | |
|---|---|---|---|
| 328,740 | 10/1885 | Wiederer | 248/471 |
| 631,033 | 8/1899 | Wright et al. | 248/471 |
| 1,612,693 | 12/1926 | Bausch . | |
| 1,792,127 | 2/1931 | Shulman et al. | 248/471 |
| 2,468,209 | 4/1949 | Klein | 248/165 |
| 2,650,052 | 8/1953 | Bintz | 248/528 |
| 3,682,421 | 8/1972 | Spiegel | 248/165 X |

*Primary Examiner*—William H. Schultz

*Attorney, Agent, or Firm*—Max E. Shirk

[57] ABSTRACT

Elongated support members are coupled to the elongated grip portion of a hand-held implement, such as a reading glass, mirror or the like, in a manner such that each support member may be moved from a convergent position where the major axes of the support members lie substantially parallel to each other and to the major axis of the grip portion in contact therewith along a major portion of the length of each support member to a divergent position where each of the support members extends laterally from the lower end of the grip portion with the major axes of the support members diverging outwardly from each other for supporting the implement in a vertical or a near-vertical position, thereby freeing the hands of a user of the implement. The support members and hand-held implements may be held in many predetermined rotated positions with respect to their associated grip portions.

6 Claims, 12 Drawing Figures

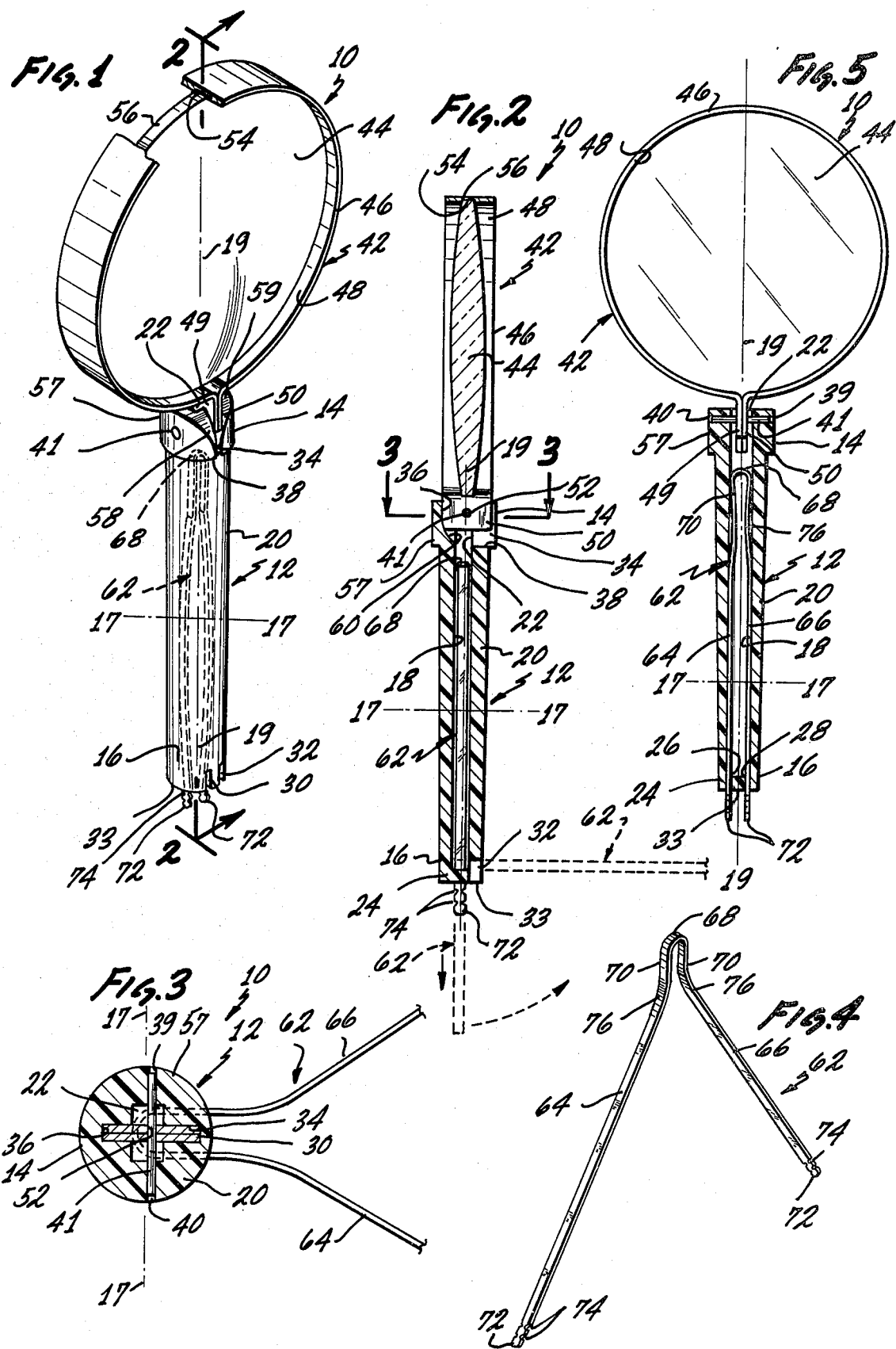

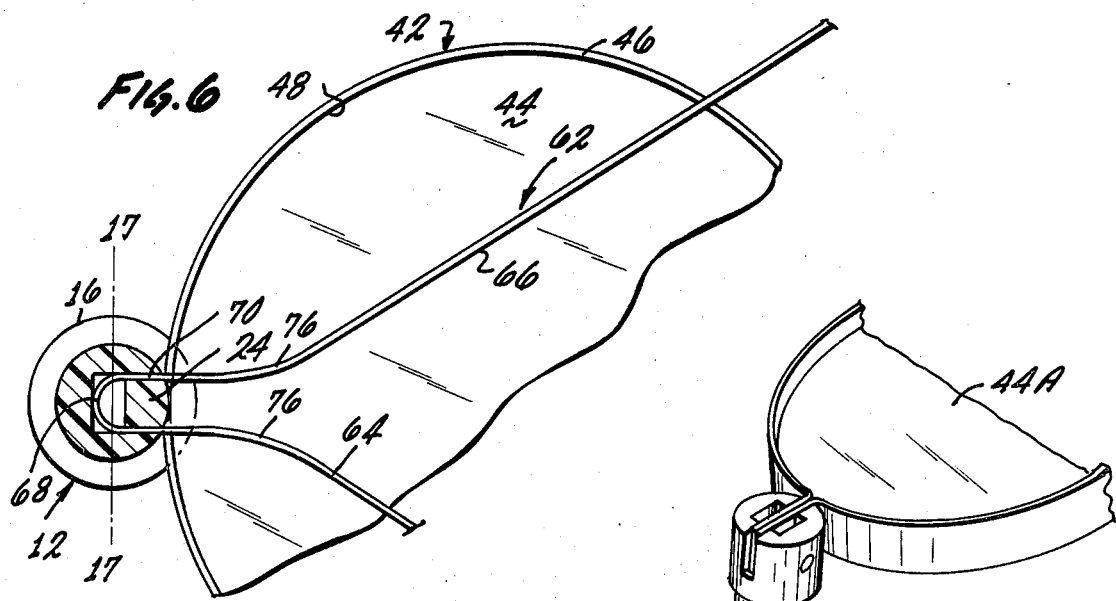
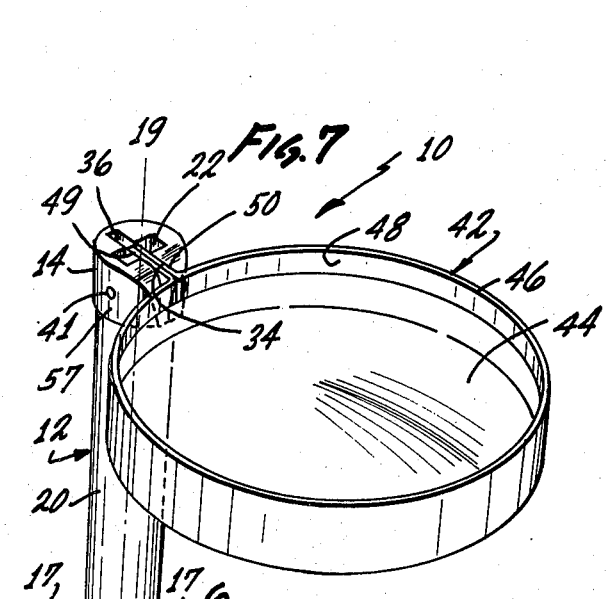
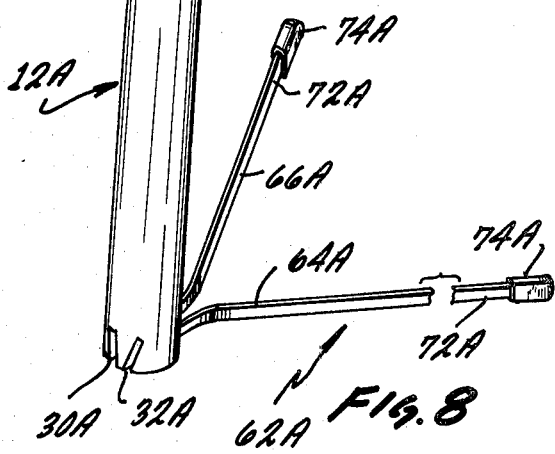
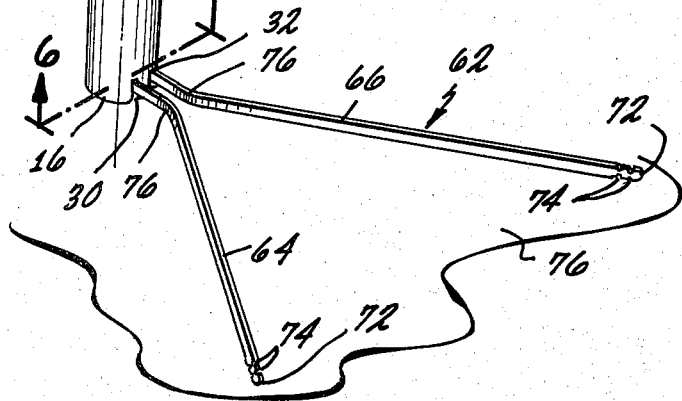
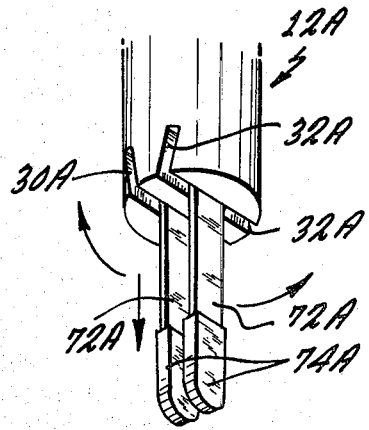

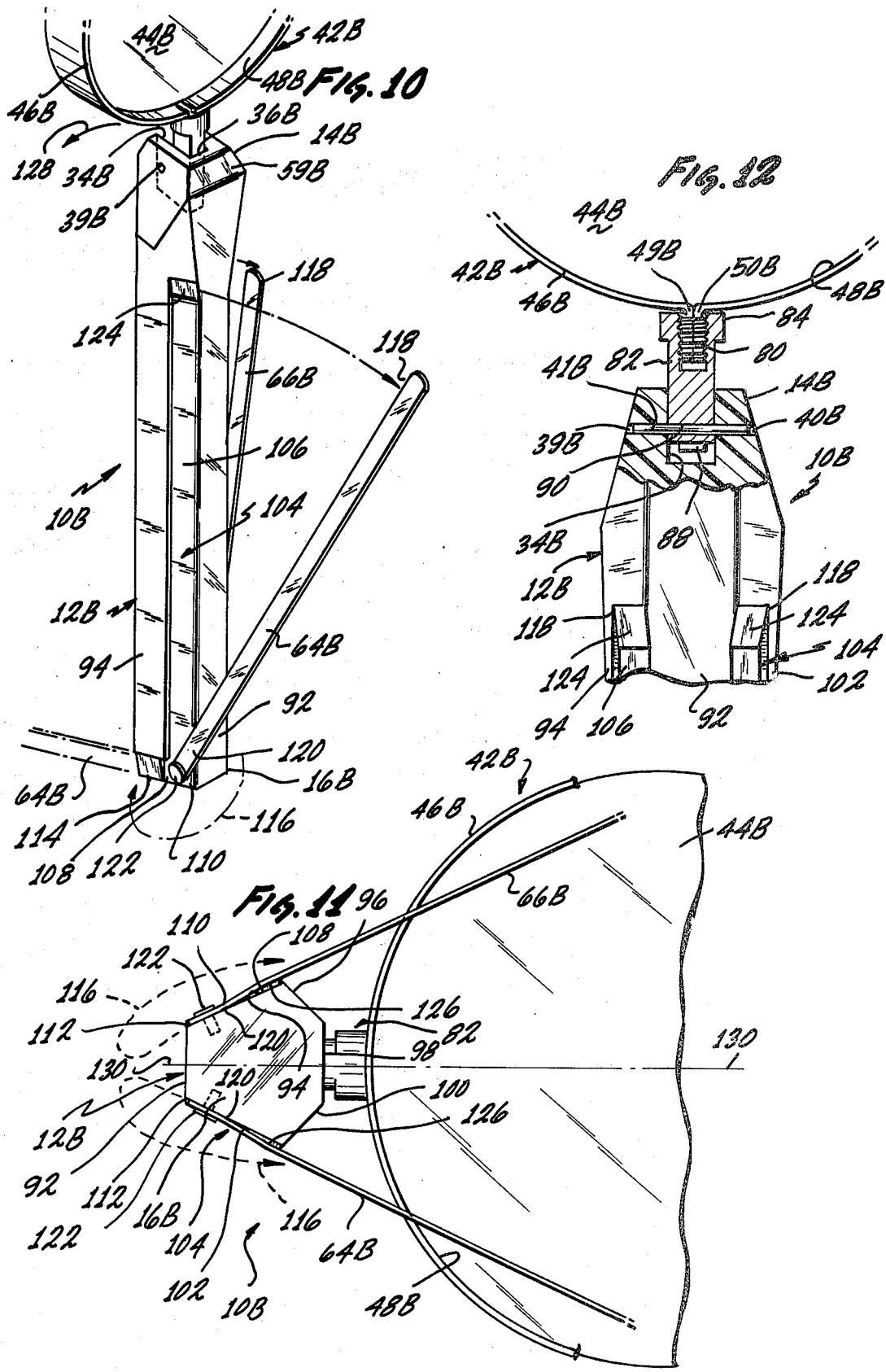

STAND FOR SUPPORTING A HAND-HELD IMPLEMENT

BACKGROUND OF THE INVENTION

The background of the invention will be set forth in two parts.

1. Field of the Invention

The present invention pertains generally to stands for supporting hand-held implements and more particularly to support members having a convergent position where they do not interfere with the holding of the implement in the hand of a user and a divergent position where they support the implement, thereby freeing the hands of the user.

2. Description of the Prior Art

Applicant made a cursory examination of patents on file in the public library in Los Angeles, Calif. and found but a single patent considered by applicant to be of sufficient pertinence to warrant obtaining a copy thereof.

This patent is Bausch U.S. Pat. No. 1,612,693 which discloses a pocket magnifying glass comprising a lens mounted on adjustably connected parts adapted to be arranged for supporting the lens in properly focused relation to the object to be viewed and also for folding compactly into a small flat space when not in use. The support is formed of thin sheet metal with the parts arranged to fold compactly together in such a manner as to fully protect the lens.

SUMMARY OF THE INVENTION

According to the present invention, a stand is provided for supporting a hand-held implement in a substantially upright position; the implement has an elongated grip portion sized to fit comfortably in a user's hand; the elongated grip portion includes upper and lower ends and major and minor axes and the implement has an instrument, such as a magnifying glass or a mirror, affixed to the upper end of the elongated grip portion.

The stand comprises a pair of elongated support members each having major and minor axes and apparatus coupling the support members to the elongated grip portion in a manner such that each support member may be moved from a convergent position where the major axes of the support members lie substantially parallel to each other and to the major axis of the grip portion in contact therewith along a major portion of the length of each support member to a divergent position where each of the support members extends laterally from the lower end of the grip portion with the major axes of the support members diverging outwardly from each other with respect to the lower end of the grip portion and lying approximately normal to the major axis of the grip portion whereby the support members will support the implement in its substantially upright position. The instrument may be articulately coupled to the upper end of the elongated grip portion for permitting the swinging of the instrument from a vertical position to a substantially horizontal position, or any intermediate position, while the elongated grip portion remains in its vertical position.

In a first form of the present invention, the apparatus coupling the support members to the elongated grip portion comprises a bight member connecting the support members together into a unitary structure with the support members each having a free end and a natural resiliency normally biasing the free ends to positions diverging away from each other; an elongated channel formed inside the grip portion along its major axis and extending from its upper end to a point closely adjacent its lower end, whereby a bottom wall and an encompassing side wall are provided on the grip portion with the bottom wall having an outside, lower surface forming the lower end of the grip portion; and a pair of spaced-apart slots provided in the bottom wall in communication with the channel with each of the slots piercing the side wall and extending from the outside, lower surface of the bottom wall vertically upwardly in the side wall to a position above the bottom wall so that the convergent position of the support members may be accomplished by positioning them in the channel with the bight member adjacent the upper end of the elongated grip portion and with the free end of the support member extending through an associated one of the slots in the bottom wall to a position externally of the lower end so that the encompassing side wall and the slots will hold the support members in the convergent position against the bias on the free ends so that the free ends may be grasped by the user for withdrawing the members from the channel to a position such that the bight member bottoms out on the bottom wall when each of the support members is positioned in the side wall-piercing portion of its slot in frictional engagement therewith and with the major axis of each support member spread to its normally divergent position and lying approximately normal to the major axis of the elongated grip portion or in intermediate positions.

The instrument is articulately coupled to the upper end of the elongated grip portion so that it may be moved from a vertical position to a horizontal position. The side wall-piercing portions of the slot would be located on the same side of the grip portion which the instrument overhangs when it is moved to its horizontal position so that the instrument will overlie the diverging support members. If the instrument is a mirror having two faces, then a second pair of side wall-piercing slots may be provided in the grip portion 180° from the first pair of slots.

In a modified form of the present invention, first and second L-shaped grooves having sidewalls constituting preferred stop members may be provided on the grip portion with each groove having a long leg extending from the lower end of the grip portion to a point adjacent the upper end thereof and a short leg extending along the lower end of the grip portion normal to the long leg with the short legs lying in divergent vertical planes. First and second pivot pins may then be used for swingably connecting one end of each of the support members to an associated one of the short legs at the intersection with its long leg, whereby each of the support members may be swung from a convergent, nested position in the long leg of its groove to a divergent position in the short leg of its groove. Suitable wedge-like members may be used to frictionally hold the support members in positions between the stop members.

The features of the present invention which are believed to be novel are set forth with particularly in the appended claims. The present invention both as to its organization and manner of use, together with further objects and advantages thereof may best be understood by making reference to the following description, taken in connection with the accompanying drawings in

BRIEF DESCRIPTION OF THE DRAWINGS

FIG. 1 is a perspective view, with parts broken away to show internal construction, of a hand-held implement and stand combination constituting a first embodiment of the present invention;

FIG. 2 is a vertical, cross-sectional view of the combination of FIG. 1;

FIG. 3 is a cross-sectional view taken along line 3—3 of FIG. 2;

FIG. 4 is an enlarged, perspective view of the support members forming a portion of the stand of FIG. 1;

FIG. 5 is a reduced, cross-sectional view taken at right angles to the view of FIG. 2;

FIG. 6 is an enlarged, cross-sectional view taken along lines 6—6 of FIG. 7;

FIG. 7 is a perspective view showing the combination of FIG. 1 being supported by the stand of the present invention;

FIGS. 8 and 9 are perspective views of a stand and hand-held implement combination constituting a modified form of the present invention;

FIG. 10 is a perspective view of a stand and hand-held implement combination constituting a second modified form of the invention;

FIG. 11 is a bottom plan view, on an enlarged scale, of the combination of FIG. 10 showing the implement in use with the stand in a divergent position;

FIG. 12 is an enlarged, partial elevational view of the combination of FIG. 10 with parts broken away to show the internal construction.

DESCRIPTION OF THE PREFERRED EMBODIMENTS

Referring again to the drawings and more particularly to FIGS. 1-7, a stand and hand-held implement combination constituting a first embodiment of the present invention, generally designated 10, includes a handle or grip portion 12 having an upper end 14, a lower end 16, across which a minor axis 17—17 extends, and an elongate channel 18 (FIGS. 2 and 5), extending along the major 19—19 of handle 12. Channel 18 extends within handle 12 from a point adjacent lower end 16 to and through upper end 14 such that an encompassing sidewall 20, an open top 22 and a bottom wall 24 are provided in handle 12.

Spaced-apart vertical slots 26, 28 (FIG. 5) are provided in bottom wall 24 in communication with channel 18 in a manner such that each slot includes portions 30, 32, respectively, piercing sidewall 20 from a first point at the underside 33 of bottom wall 24, defining the lower end 16, to a point a predetermined distance above bottom wall 24, as will be more fully described hereinafter.

Upper end 14 may be provided with a transverse slot 34 piercing the same side of sidewall 20 as the portions 30, 32 of slots 26, 28 and stopping short of the opposite side of sidewall 20, so that a vertical stop member 36 and a horizontal stop member 38 are provided in upper end 14. Upper end 14 may also be provided with a first aperture 39, which pierces sidewall 20 90° counterclockwise from slot 34, as viewed in FIG. 3, and a second aperture 40 which pierces sidewall 20 90° clockwise from slot 34, for receiving a pin 41 swingably connecting a suitable instrument 42, shown herein for purposes of illustration, but not of limitation, as comprising a magnifying glass.

Instrument 42 includes a convex magnifier 44 carried by a band 46 having an arcuate portion 48 at each end of which are straight, tang portions 49, 50, respectively, each provided with an aperture 52 receiving pin 41. A groove 54 (FIGS. 1 and 2) may be provided in the arcuate portion 48 of band 46 for trapping the peripheral edge portion 56 of magnifier 44.

Instrument 42 is adapted to be swung from the vertical position shown in FIGS. 1, 2 and 5 to the horizontal position shown in FIGS. 6 and 7. Additionally, the natural resiliency in band 46 tends to spring portions 49, 50 apart into firm frictional engagement with sidewall 20 so that instrument 42 may be maintained in positions between the vertical and horizontal positions shown. Alternatively, Bellville washers may be used for this purpose. The diameter of grip portion 12 may be increased at upper end 14 to provide an increased-diameter portion 57 adapted to resist the force exerted by tang portions 49, 50. Protion 57 may be provided with chamfers 58, 59 and a fillet 60 (FIG. 2) may be provided in slot 34 between vertical stop 36 and horizontal stop 38 to accommodate instrument 42 in its rotated positions.

Referring now to FIG. 4, the stand and hand-held implement 10 also includes a U-shaped support 62 having elongated support members 64, 66 connected together into a unitary structure by bight member 68 formed integrally with one end 70 of each support member 64, 66. The support members 64, 66 each includes a free end 72 provided with serrations 74 and is provided with a slight bend 76 adjacent end 70 so that members 64, 66 will normally diverge to the positions shown in FIG. 4. Member 62 is preferably made from a springy material, such as spring steel.

Referring again to FIGS. 1-7, handle 12 is preferably made from a suitable plastic material as a one-piece unit by injection-molding methods. Open top 22 then forms an assembly slot through which ends 72 of support members 64, 66 may be inserted after they have been squeezed together to the convergent positions shown in FIGS. 1 and 5. Member 62 may then be slid downwardly in channel 18 until end 72 of support member 64 passes through slot 26 in bottom wall 24 and end 72 of support member 66 passes through slot 28 to positions below bottom wall 24 so that serrations 74 may be grasped for sliding support 62 downwardly in channel 18 until bight member 68 bottoms out on bottom wall 24 whereupon support member 64 may be swung upwardly in slot 30 in frictional engagement therewith and support member 66 may be swung upwardly in slot 32 so that support members 64, 66 may be maintained in various angular positions, including approximately normal to the major axis 19—19 of handle 12, and will lie in the divergent positions shown in FIGS. 3, 6 and 7 for supporting handle 12 in near upright or substantially upright positions whereupon instrument 42 may be swung to, and maintained in, various near-horizontal positions or the position shown in FIG. 7 where it overlies support 62; both hands of a user are then free to work on material placed on a supporting surface 76 between members 64, 66.

When support 62 is in its FIG. 5 position, it is in a convergent position where the major axes of support members 64, 66 lie substantially parallel to each other and to the major axis 19—19 of grip portion 12 in contact therewith along a major poriton of the length of each support member 64, 66. When support 62 is moved to its FIG. 7 position, the support members 64, 66 extend laterally from the lower end 16 of handle 12 with the major axes of the support members diverging outwardly from each other with respect to the lower end 16 of grip portion 12. Thus, bight member 68, elongated channel 18, bottom wall 24 and slots 26, 28, 30 and 32 couple support members 64, 66 to handle 12 in a manner such that each support member may be moved from the convergent position to the divergent position previously described.

A modified form of the invention shown in FIGS. 1–7 is shown in FIGS. 8 and 9 wherein magnifier 44 may be replaced with a two-faced mirror 44a and a second pair of sidewall-piercing slots 30a, 32a are provided in handle 12a 180° from the first pair of slots so that support members 64a, 66a may be positioned on either side of handle 12a for supporting mirror 44a regardless of which face of mirror 44a is uppermost when it is swung to one side.

It is an important feature of this form of the invention that slot 30a, 32a each be placed in handle 12a at a suitable angle with respect to the major axis of handle 12a to increase the friction between slots 30a, 32a and supporting members 64a, 66a, respectively.

The free ends 72a of the support members 64a, 66a may be provided with a knob 74a forming grip to facillitate withdrawing support 62a from handle 12a. The thickness of each knob 74a may be such that free ends 72a do not frictionally engage the sidewalls of slots 30a, 32a when knobs 74a are squeezed together. Alternatively, knobs 74a may be mounted on free ends 72a in a rotated 90° position to form flat gripping surfaces which may be used without squeezing free ends 72a, 72a together.

Another modified form of the present invention is shown in FIGS. 10–12 wherein a stand and hand-held implement combination 10b includes a handle or grip portion 12b having an upper end 14b and a lower end 16b. A U-shaped slot is provided in upper end 14b in a manner such that the bight portion of the slot forms a vertical stop 36b; apertures 39b, 40b are also provided in upper end 14b in suitable positions so that a pin 41b may be put in upper end 14b with its major axis extending across slot 34b.

Combination 10b also includes a suitable instrument 42b shown herein for purposes of illustration but not of limitation as comprising a magnifying glass assembly including a magnifier 44b encompassed by a band 46b having an arcuate portion 48b and straight portions 49b, 50b captured by a split stud 80. Instrument 42b is swingably connected to upper end 14b of handle 12b by a suitable internally-threaded pivot member 82 having an upper end 84 provided with internal threads 86 receiving split stud 80. Internally-threaded pivot member 82 also has a lower end 88 provided with an aperture 90 for receiving pin 41b. Pivot member 82 and slot 34b are preferably shaped and dimensioned in a manner such that member 82 will engage slot 34b with an interference fit facillating maintaining instrument 42b in various rotated positions with respect to upper end 14b. Upper end 14b may also be provided with chamfers 58b, 59b enhancing the appearance of upper end 14b, and, with respect to chamfre 58b, providing clearance when instrument 42b is swung to a horizontal position.

Handle 12b has a hexagonal shape when viewed in plan from the bottom whereby six vertical sides 92, 94, 96, 98, 100 and 102 are provided. An L-shaped groove or recess 104 is provided on each side 94, 102 and includes a long leg or first stop 106 intersecting a short leg or second stop 108 at 110. Each long leg 106 intersects side 92 at 112 and each short leg 108 intersects lower end 16b at 114 so that a pair of support members 64b, 66b may be swung in the direction of arrows 116 from a convergent, nested position in an associated one of the long legs 106 to a divergent position in an associated one of the short legs 108. The support members 64b, 66b each includes a free end 118 and a secured end 120 and may be swingably mounted on handle 12b by a pivot pin 122 connecting secured end 120 to the lower end 16b at the intersecting area 110 of legs 106, 108. Each support member 64b, 66b may be maintained in its convergent, nested position by an upper wedge 124 and in its completely divergent position or any intermediate position by a lower wedge 126 provided on long legs 106 and short legs 108, respectively.

When instrument 42b is rotated in the direction of arrow 128 (FIG. 10) to one side of handle 12b, support members 64b, 66b will diverge in the direction of instrument 42b when they are swung to their FIG. 11 position. The amount of divergence will depend upon the angles sides 94 and 102 make with a vertical plane passing through the center line 130—130 of instrument 42b and handle 12b. The angles are selected to produce a sufficient spread between support members 64b, 66b to give sufficient working room between the support members and to prevent the weight of the instrument 42b from tipping the device 10b over laterally.

While the particular stand and hand-held implements herein shown and described in detail are fully capable of attaining the objects and providing the advantages hereinbefore stated, it is to be understood that they are merely illustrative of the presently-preferred embodiments of the invention and that no limitations are intended to the details of construction or design herein shown other than as defined in the appended claims which form a part of this disclosure.

Whenever the term "means" is employed in these claims, this term is to be interpreted as defining the corresponding structure illustrated and described in this specification or the equivalent of the same.

What is claimed is:

1. In combination, a stand and hand-held implement comprising:
   an elongated grip portion sized to fit comfortably in a user's hand, said elongated grip portion including upper and lower ends and major and minor axes;
   an instrument affixed to said upper end of said elongated grip portion;
   a pair of elongated support members each having major and minor axes;
   a bight member connecting said support members together into a unitary structure with said support members each having a free end and a natural resiliency normally biasing said free ends to positions diverging away from each other
   an elongated channel formed inside said grip portion along its major axis and extending from its upper end to a point closely adjacent its lower end, whereby a bottom wall and an encompassing sidewall are provided on said grip portion, said bottom wall having an outside lower surface forming said lower end of said grip portion; and
   a pair of spaced-apart slots provided in said bottom wall in communication with said channel, each of said slots piercing said sidewall and extending from said outside, lower surface of said bottom wall vertically upwardly in said sidewall to a position above said bottom wall, whereby said support members may be moved to a convergent position in said channel with said bight member adjacent said upper end of said elongated grip portion and with the free end of each support member extending through an associated one of said slots on said bottom wall to a position externally of said lower end so that said encompassing sidewall and said slots will hold said support members in said convergent position against said bias and so that said free ends may be grasped by said user for drawing said members from said channel to a position such that said bight member bottoms out on said bottom wall when each of said support members is positioned in the sidewall-piercing portion of its slot with the major axis of each support member spread to its normally divergent position and lying approximately normal to the major axis of said elongated grip portion.

2. A combination as stated in claim 1 wherein a second pair of sidewall-piercing slots are provided in said lower end of said grip portion 180° from the other pair of slots, whereby said support members may be positioned in said second pair of slots for supporting said implement in a substantially upright position.

3. In combination, a stand and hand-held implement comprising:

an elongated grip portion sized to fit comfortably in a user's hand, said elongated grip portion including upper and lower ends and major and minor axes;

an instrument affixed to said upper end of said elongated grip portion;

an elongated channel formed inside said grip portion along its major axis and extending from its upper end to a point closely adjacent its lower end, whereby a bottom wall and an encompassing sidewall are provided on said grip portion, said bottom wall having an outside lower surface forming said lower end of said grip portion;

a plurality of spaced-apart slots provided in said bottom wall in communication with said channel, each of said slots piercing said bottom wall and said sidewall and extending from said bottom wall vertically upward in said sidewall as a continuous opening to a position above said bottom wall;

a plurality of elongated support members each having first and second ends and major and minor axes, said support members being reciprocably mounted in said channel for movement from a position in said channel with said first ends adjacent said upper end of said elongated grip portion and with the second end of each support member extending through an associated one of said slots on said bottom wall externally of said lower end so that said second ends may be grasped by said user for drawing said members from said channel to a position such that said first ends bottom out on said bottom wall when each of said support members is positioned in the sidewall-piercing portion of its slot with the major axis of each support member lying approximately normal to the major axis of said elongated grip portion; and means provided on said first ends of said support members for retaining said first ends in said bottomed-out positions.

4. A combination as recited in claim 3 wherein a a pair of elongated support members and slots constitutes said plurality thereof.

5. A stand as stated in claim 1 wherein said instrument is a magnifying glass.

6. A stand as stated in claim 5 wherein said implement includes second means articulately coupling said magnifying glass to said upper end of said elongated grip portion for permitting the swinging of said magnifying glass from a vertical position when said elongated grip portion is in a vertical position to a substantially horizontal position while said elongated grip portion remains in its vertical position.

* * * * *